(12) United States Patent
Basora

(10) Patent No.: US 7,028,606 B2
(45) Date of Patent: Apr. 18, 2006

(54) CITRUS FRUIT JUICE SEPARATOR WITH POURING ACCESSORY

(75) Inventor: Antonio Basora, Barcelona (ES)

(73) Assignee: SEB S.A., Ecully Cedex (FR)

( * ) Notice: Subject to any disclaimer, the term of this patent is extended or adjusted under 35 U.S.C. 154(b) by 0 days.

(21) Appl. No.: 10/979,810

(22) Filed: Nov. 3, 2004

(65) Prior Publication Data

US 2005/0126404 A1     Jun. 16, 2005

(30) Foreign Application Priority Data

Nov. 4, 2003   (FR) .................................. 03 12913

(51) Int. Cl.
  *A23N 1/00*   (2006.01)
  *A47J 19/02*  (2006.01)
(52) U.S. Cl. ........................... 99/504; 99/501; 99/503; 99/505; 99/508
(58) Field of Classification Search .................. 99/495, 99/501–508, 509–513; 100/98 R, 208, 213
See application file for complete search history.

(56) References Cited

U.S. PATENT DOCUMENTS

| | | | | |
|---|---|---|---|---|
| 1,507,880 A | * | 9/1924 | Zouvelos | 99/503 |
| 2,160,388 A | * | 5/1939 | Morse | 99/503 |
| 2,176,377 A | * | 10/1939 | Gamble | 99/508 |
| 2,186,671 A | * | 1/1940 | Fromm | 99/503 |
| 2,186,672 A | * | 1/1940 | Fromm | 99/503 |
| 4,378,730 A | | 4/1983 | Coggiola | |
| 6,070,519 A | * | 6/2000 | Sham et al. | 99/348 |
| 6,135,018 A | * | 10/2000 | Yu et al. | 99/504 |
| 6,138,556 A | * | 10/2000 | Yu et al. | 99/504 |
| 6,363,837 B1 | * | 4/2002 | Sham et al. | 99/348 |
| 6,536,335 B1 | * | 3/2003 | Ashworth | 99/501 |
| 6,668,709 B1 | * | 12/2003 | Codina Vilana et al. | 99/503 |
| 6,860,196 B1 | * | 3/2005 | Areh et al. | 99/502 |

FOREIGN PATENT DOCUMENTS

| | | |
|---|---|---|
| DE | 1 248 247 | 8/1967 |
| DE | 39 23 865 A1 | 1/1991 |
| EP | 1 297 767 B1 | 6/2000 |
| GB | 685987 | 1/1953 |
| GB | 2 275 415 A | 8/1994 |

* cited by examiner

*Primary Examiner*—Timothy F. Simone
(74) *Attorney, Agent, or Firm*—Browdy and Neimark, PLC

(57) ABSTRACT

An electric juicer having a housing, or case, a juice receptacle arranged on the case, a pouring accessory disposed on the receptacle and a juicer cone. The case contains a motor for rotating the cone through the intermediary of a transmission, the pouring accessory has a bottom permitting gravity flow of the collected juice toward a lateral flow outlet, and the bottom has an opening providing for the passage of the transmission. In accordance with the invention, the pouring accessory has a transmission axis, or shaft, belonging to the transmission, the shaft being mounted for free rotation in the opening. This arrangement permits the juicer to be used with or without the pouring accessory.

14 Claims, 3 Drawing Sheets

CITRUS FRUIT JUICE SEPARATOR WITH POURING ACCESSORY

BACKGROUND OF THE INVENTION

The present invention relates to the field of electric citrus fruit presses, or juice separators, also commonly known as juicers.

Such electric juice presses, or juicers, usually have a base containing a motor, a receptacle for collecting the juice, a sieve for collecting the pulp, and a pressing cone. Multifunction household food processors can include a juicer accessory such as a juicer cone arranged in a filter sieve disposed on the processing bowl of the appliance, the cone being driven by a transmission that passes through the bowl.

GB patent no. 2 275 415 discloses a juicer of the above-cited type, having a pouring accessory between the receptacle and the sieve. The pouring accessory has an outlet. The accessory can occupy either one of two positions on the receptacle: a first position in which the outlet is disposed above the receptacle; and a second position in which the outlet is disposed above a lower opening of the receptacle, so that the juice can flow into a container placed alongside the appliance. Such an appliance thus permits the juice to be collected either in the receptacle of the appliance, or in a separate container. However, the receptacle of this appliance has a particular construction, due to the presence of the lower opening.

BRIEF SUMMARY OF THE INVENTION

The present invention provides a juicer having a simplified structure while permitting juice to be collected either in the receptacle of the juicer, or in a separate container disposed next to the juicer.

More specifically, the present invention provides an electric juicer having a housing, or case, a juice receptacle arranged on the case, a pouring accessory disposed on the receptacle and a juicer cone, the case containing a motor for rotating the cone through the intermediary of a transmission, the pouring accessory having a bottom permitting gravity flow of the collected juice toward a lateral flow outlet, and the bottom having an opening providing for the passage of the transmission. In particular accordance with the invention, the pouring accessory has a transmission axis, or shaft, belonging to the transmission, the shaft being mounted for free rotation in the opening. This arrangement permits the juicer to be used with or without the pouring accessory.

Thus, construction of the juicer is simplified, and the juice receptacle can, or need not, be removable from the case.

Advantageously, a filter sieve is arranged under the cone and can be arranged on the pouring accessory or on the juice receptacle.

According to an advantageous embodiment, the juice receptacle has a shaft, or tube, for the passage of a drive shaft forming part of the transmission. The juice receptacle thus need not be provided with an element belonging to the transmission. Preferably, the juice receptacle is then removable from the case. Alternatively, a part of the transmission can be mounted on the juice receptacle.

Advantageously then, the pouring accessory has, around the opening, a non-circular annular structure that is configured to cooperate with a non-circular upper part of the tube. This arrangement permits rotation of the accessory relative to the receptacle to be prevented.

Also advantageously, the transmission shaft has a lower part driven by the drive shaft.

According to a further advantage, the transmission shaft has an upper part that is capable of driving the cone either directly or indirectly.

Also advantageously, the upper part of the transmission shaft has two structures that are angularly offset from one another and of respectively different heights. This arrangement enables the cone to be maintained at either one of two different heights above the filter screen, in order to obtain juice containing more or less pulp.

According to a further advantage relating to improved ergonomics, the lateral flow outlet is engaged on a pouring lip of the juice receptacle.

DETAILED DESCRIPTION OF THE INVENTION

Figure 1:
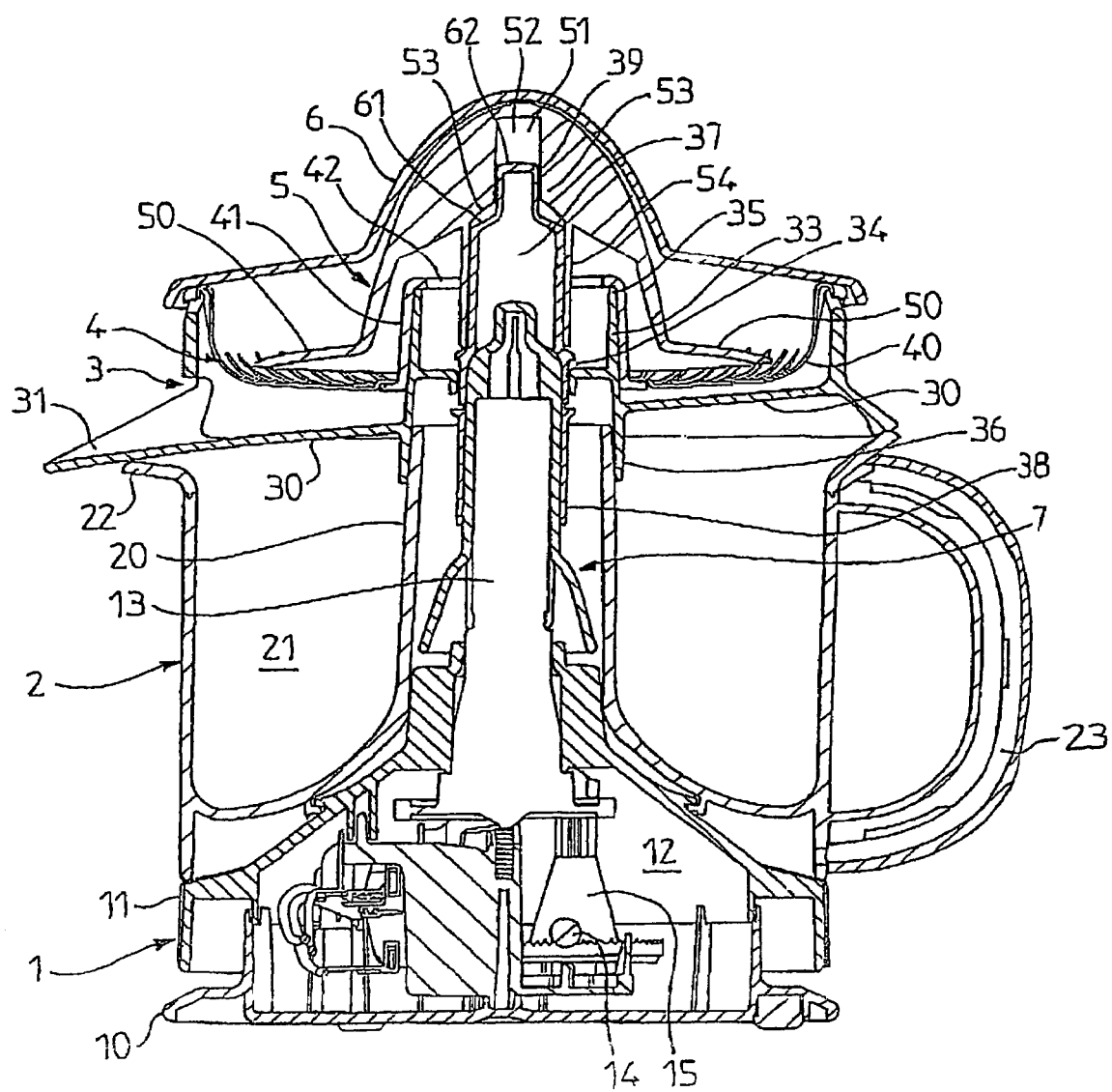
FIG. 1 is an elevational cross-sectional view of one embodiment of a juice press according to the invention, having a pouring accessory.

The electric juicer shown in FIG. 1 has a case 1, a juice receptacle 2 arranged on case 1, a pouring accessory 3 disposed on receptacle 2, a filter sieve, or screen, 4 disposed on accessory 3, a juice extracting cone 5 and a lid 6. Filter sieve 4 has the general form of a bowl having a bottom provided with an array of angularly spaced, radially extending narrow slots.

Case 1 has a base 10 and an upper half-shell 11 forming a housing 12 containing a motor (not visible in FIG. 1) connected to a drive shaft 13. The motor drives a cone 5 through the intermediary of a transmission 7 that is coupled to shaft 13. More specifically, the motor has an output shaft 14 that is coupled to shaft 13 through the intermediary of a transmission unit 15. Shaft 13 forms a unit with transmission 7 and extends upwardly from the upper face of case 1.

Juice receptacle 2 has a tube, or hollow shaft, 20 through which shaft 13 passes. Receptacle 2 provides an annular vessel 21 that surrounds tube 20. Receptacle 2 has a pouring spout, or lip, 22 at its upper extremity. Receptacle 2 also has a handle 23. Tube 20 provides a passage for drive shaft 13.

Figure 2:
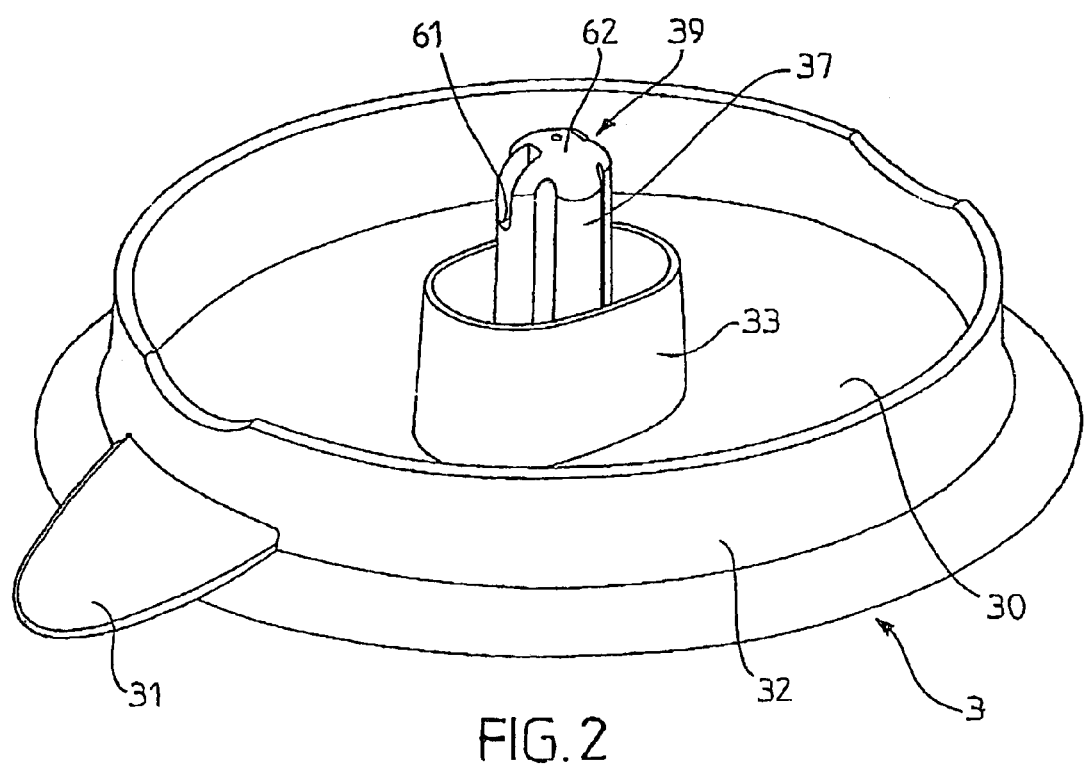
FIG. 2 is a perspective view of the pouring accessory of the embodiment of FIG. 1.
Figure 3:
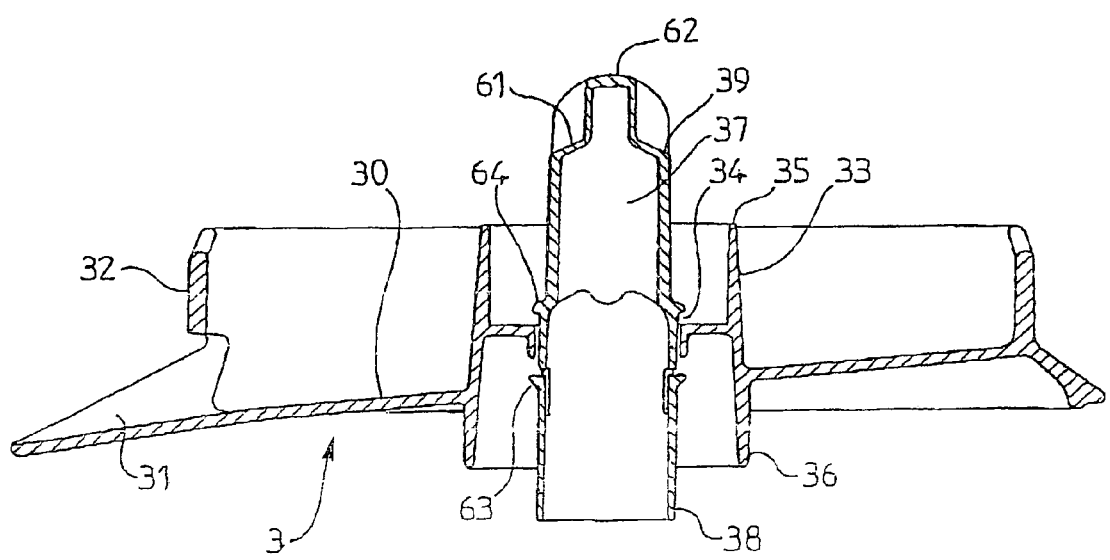
FIG. 3 is an elevational cross-sectional view of the pouring accessory shown in FIGS. 1 and 2.

Pouring accessory 3 has a bottom 30 that is inclined toward a lateral flow outlet 31. Accessory 3 also has a side wall 32 that surrounds bottom 30, as shown in FIGS. 2 and 3. When accessory 3 is installed on receptacle 2, flow outlet 31 engages on pouring lip 22 and helps to prevent accessory from rotating relative to receptacle 2. Bottom 30 is provided with an upwardly extending central tube, or shaft, 33 that surrounds an opening 34 provided for the passage of transmission 7. Tube 33 has an upwardly extending annular wall 35 that surrounds opening 34. Shaft 33 itself is slightly frustoconical.

Pouring accessory 3 has a lower annular tubular structure 13 that also surrounds opening 34 and that cooperates with an upper part of shaft 20 of receptacle 2. More particularly, structure 36 and the upper part of shaft 20 are both slightly frustoconical, with a non-circular cross section that assures that accessory 3 will be prevented from rotating relative to receptacle 2. Annular structure 36 fits around the upper part of shaft 20 when accessory 3 is installed.

Accessory 3 carries a transmission shaft 37 that forms part of transmission 7. Shaft 37 is mounted to be freely rotatable in opening 34 and shaft 37 has a lower part 38 constructed to engage with shaft 13 so as to rotate as a unit therewith. Shaft 37 has an upper part 39 configured to engage with cone 5 in a manner to cause cone 5 to rotate therewith. Thus, cone 5 will be rotated by the motor (not shown) via shaft 14, transmission 15, shaft 13, transmission 7 and shaft 37.

Filter sieve 4 arranged under cone 5 has an annular filtration zone 40 surrounding a central structure 41 that encloses a passage 42. Central structure 41 is constructed to engage around upper central tube 33 of accessory 3. Central structure 41 and the upper part of tube 33 are both slightly frustoconical with a non-circular cross section.

Cone 5 is provided, in a conventional manner, with lower wings 50 that extend radially away from the axis of rotation of the device. Cone 5 further has, at its interior, a recess that is shaped to form a drive coupling 51 that can be engaged by the upper part 39 of transmission shaft 37. More particularly, coupling 51 has a concave structure 52 surrounded by convex structures 53, as shown in FIG. 1. Cone 5 also has a downwardly extending tubular portion 54 that helps to guide cone 5 on upper part 39 of transmission shaft 37.

Pouring accessory 3 permits juice extracted by the action of cone 5 to be collected in a vessel disposed under lateral flow outlet 31. The bottom of accessory 3 permits a gravity flow of the collected juice toward lateral flow outlet 31.

The upper part 39 of shaft 37 of accessory 3 has two recessed parts 61 that are angularly spaced from, and preferably diametrically opposed to, one another, and a structural part 62 that is disposed between parts 61. Part 62 is located above the bottoms of parts 61 as shown in FIGS. 2 and 3. When the convex structures 53 of cone 5 are engaged in parts 61, as shown in FIG. 1, part 62 is engaged in concave structure 52. Lower wings 50 are then in proximity to filter sieve 4 so that the pulp is pressed and a maximum quantity of juice can be separated from the pulp. When the structures 53 are engaged against the higher part 62, lower wings 50 are spaced at some distance above filter sieve 4 and the pulp is not pressed, so that juice with a higher pulp content is obtained. Thus, juice having two different qualities, or pulp contents, can be obtained. This feature is disclosed in German patent document DE 3923865, the disclosure of which is incorporated herein by reference.

Lower part 38 and upper part 39 of transmission shaft 37 are made of two parts that are assembled together in a manner such that transmission shaft 37 is freely rotatable in opening 34 of accessory 3, while being allowed to undergo a limited degree of axial translation movement between lugs 63 and 64, lugs 63 being formed on lower part 38 and lugs 64 being formed on upper part 37. This limited degree of axial translation movement helps to prevent the occurrence of undesired friction.

Figure 4:
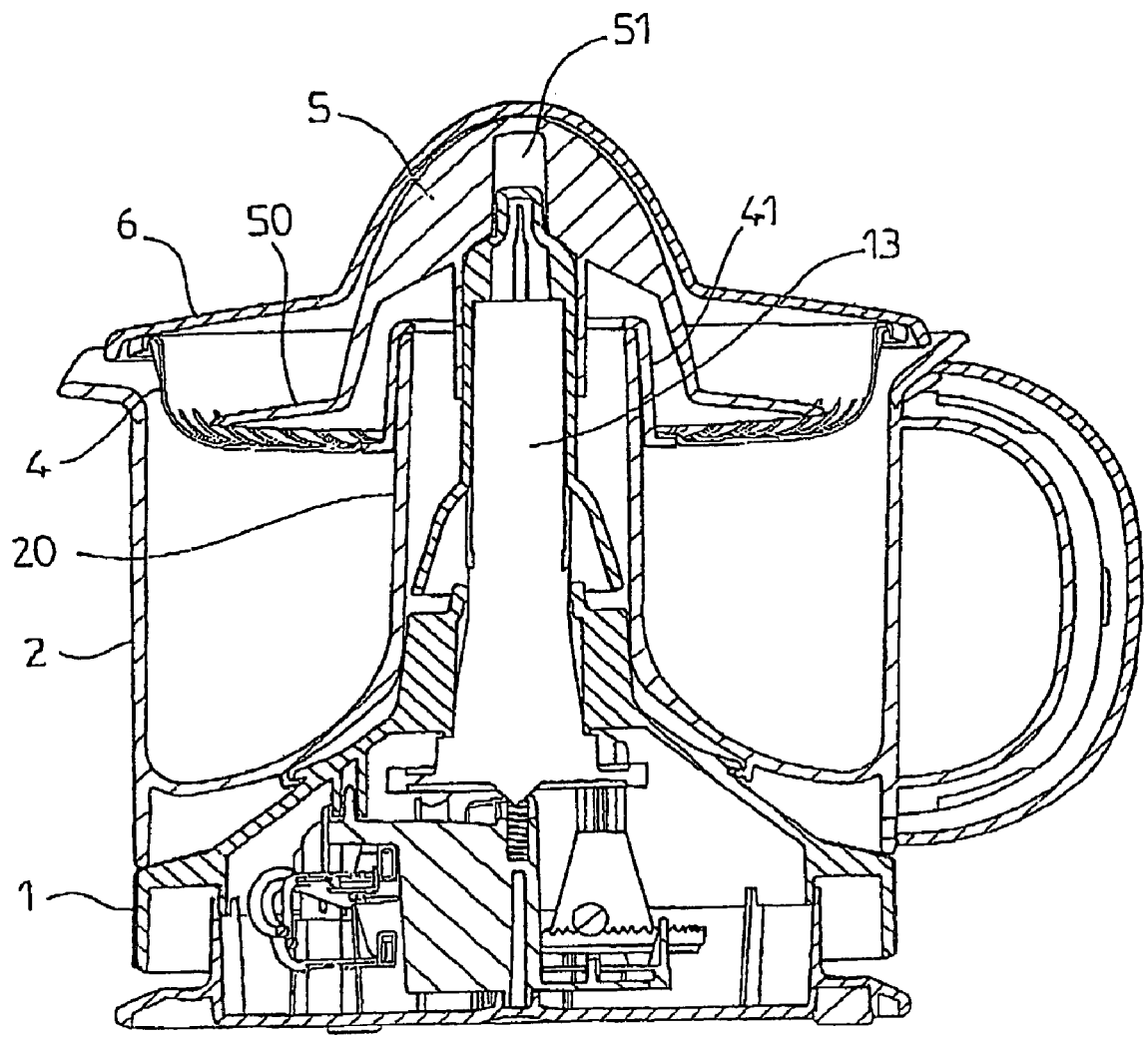
FIG. 4 is an elevational cross-sectional view of the embodiment shown in FIG. 1, with the pouring accessory removed.

FIG. 4 shows the juicer according to the invention with pouring accessory 3 removed, removal of accessory 3 being accompanied by removal of shaft 37, including lower part 38. In this configuration, structure 41 of filter sieve 4 is engaged around tube 20 of receptacle 2. Coupling 51 of cone 5 is engaged on drive shaft 13, the upper end of which has a configuration similar to that of the upper end of shaft 37. Thus, drive shaft 13 can have coupling parts similar to parts 61 and 62 to cooperate with convex structures 53 of cone 5. This, again, allows cone 5 to be positioned at either one of two distances above sieve 4 to obtain, as described earlier, two different qualities of juice, even when accessory 3 is removed.

According to one variation, drive shaft 13 can be formed as part of receptacle 2. According to another alternative, receptacle 2 can be fixed to case 1.

According to another variation, transmission shaft 37 and/or transmission shaft 13 can rotate cone 5 in an indirect manner. For example, the axis of rotation of cone 5 could be offset from the axis of transmission shaft 37 and/or of drive shaft 13; or a transmission or speed reducer can be arranged in screen 4.

This application relates to subject matter disclosed in French Application number FR 03 12913, filed on Nov. 4, 2003, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An electric juicer comprising:
    a case;
    a juice receptacle arranged on said case;
    a pouring accessory arranged to be disposed on said receptacle;
    a juicer cone; and
    a filter sieve that is structurally independent of said pouring accessory, said filter sieve being disposed under said juicer cone,
wherein:
    said case contains means including a transmission for rotating said cone,
    said pouring accessory has a lateral flow outlet and a bottom permitting gravity flow of juice collected in said accessory toward said lateral flow outlet,
    said bottom of said accessory has an opening for passage of the transmission,
    said accessory has a transmission shaft, belonging to the transmission, and
    said transmission shaft is mounted to be freely rotatable in said opening in said bottom of said accessory.

2. The electric juicer of claim 1, wherein said juice receptacle has a tube for the passage of a drive shaft forming part of the transmission.

3. The electric juicer of claim 2, wherein said pouring accessory has, around said opening in said bottom of said accessory, a non-circular annular structure that is configured to cooperate with a non-circular upper part of said tube.

4. The electric juicer of claim 3, said transmission shaft has a lower part arranged to be driven by the drive shaft.

5. The electric juicer of claim 4, wherein said transmission shaft has an upper part that is capable of driving said juicer cone.

6. The electric juicer of claim 5, wherein said transmission shaft has an upper part of provided with two structures that are angularly offset from one another and of respectively different heights.

7. The electric juicer of claim 6, wherein said juice receptacle has a pouring lip and said lateral flow outlet of said pouring accessory is engaged on said pouring lip when said pouring accessory is on said receptacle.

8. The electric juicer of claim 1, wherein said juice receptacle has a tube for the passage of a drive shaft forming part of the transmission.

9. The electric juicer of claim 1, wherein said juice receptacle has a pouring lip and said lateral flow outlet of said pouring accessory is engaged on said pouring lip when said pouring accessory is on said receptacle.

10. The electric juicer of claim 1, wherein said pouring accessory is further arranged to be disposed under said filter sieve.

11. An electric juicer comprising:
   a case;
   a juice receptacle arranged on said case;
   a pouring accessory arranged to disposed on said receptacle; and
   a juicer cone,
wherein:
   said case contains means including a transmission for rotating said cone,
   said pouring accessory has a lateral flow outlet and a bottom permitting gravity flow of juice collected in said accessory toward said lateral flow outlet,
   said bottom of said accessory has an opening for passage of the transmission;
   said accessory has a transmission shaft, belonging to the transmission,
   said transmission shaft is mounted to be freely rotatable in said opening in said bottom of said accessory,
   said juice receptacle has a tube for the passage of a drive shaft forming part of the transmission, and
   said pouring accessory has, around said opening in said bottom of said accessory, a non-circular annular structure that is configured to cooperate with a non-circular upper part of said tube.

12. The electric juicer of claim 11, said transmission shaft has a lower part arranged to be driven by the drive shaft.

13. The electric juicer of claim 12, wherein said transmission shaft has an upper part that is capable of driving said juicer cone.

14. The electric juicer of claim 13, wherein said transmission shaft has an upper part of provided with two structures that are angularly offset from one another and of respectively different heights.

* * * * *